C. CASPARI.
AUTOMATIC STOCK FEEDER.
APPLICATION FILED MAR. 31, 1910.
1,124,859.
Patented Jan. 12, 1915.
2 SHEETS—SHEET 2.
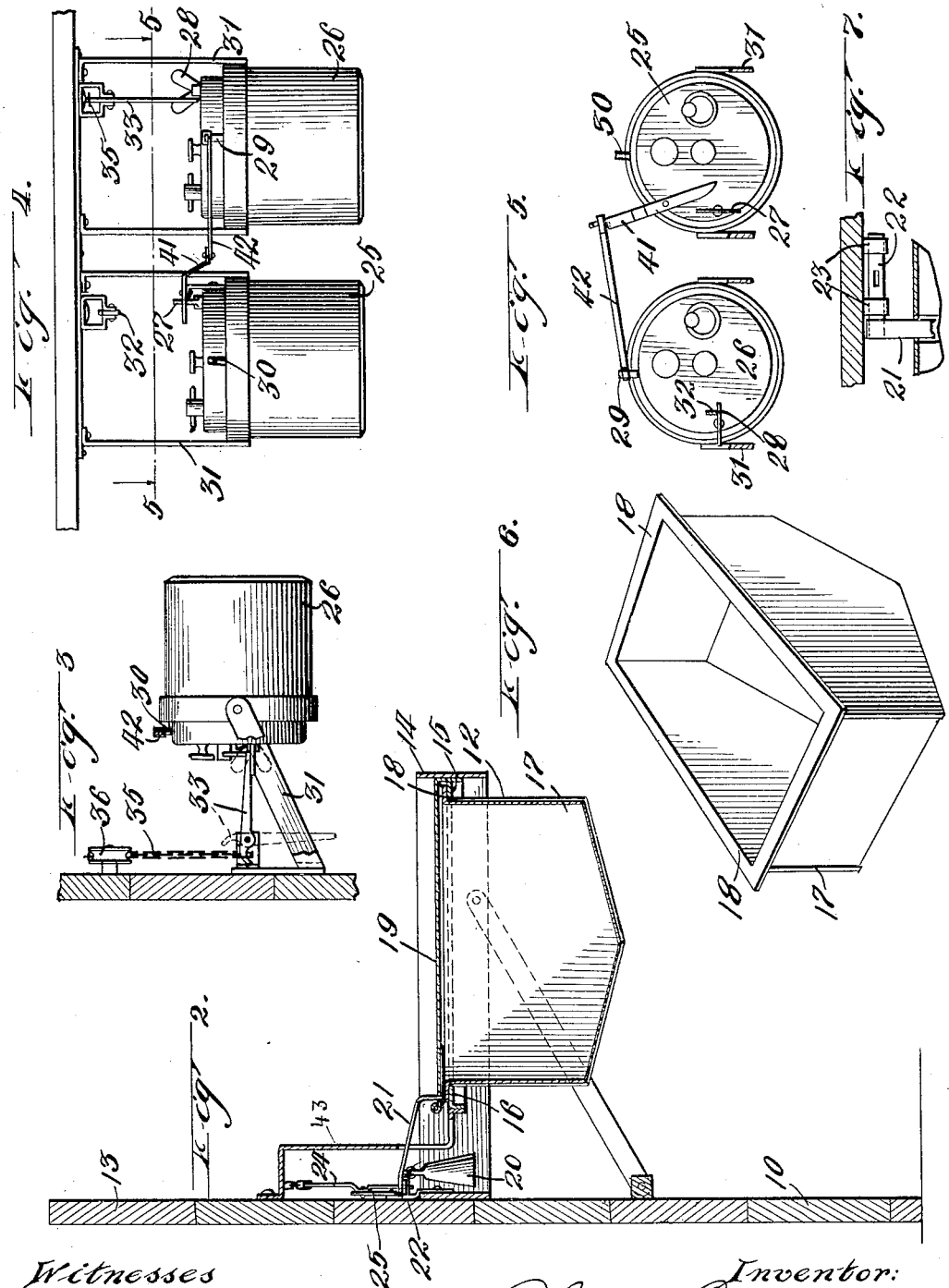
Witnesses
R. L. Farrington
Vinnie F. Johnson
Inventor:
Charles Caspari
by Benedict Morsell & Caldwell
Attys

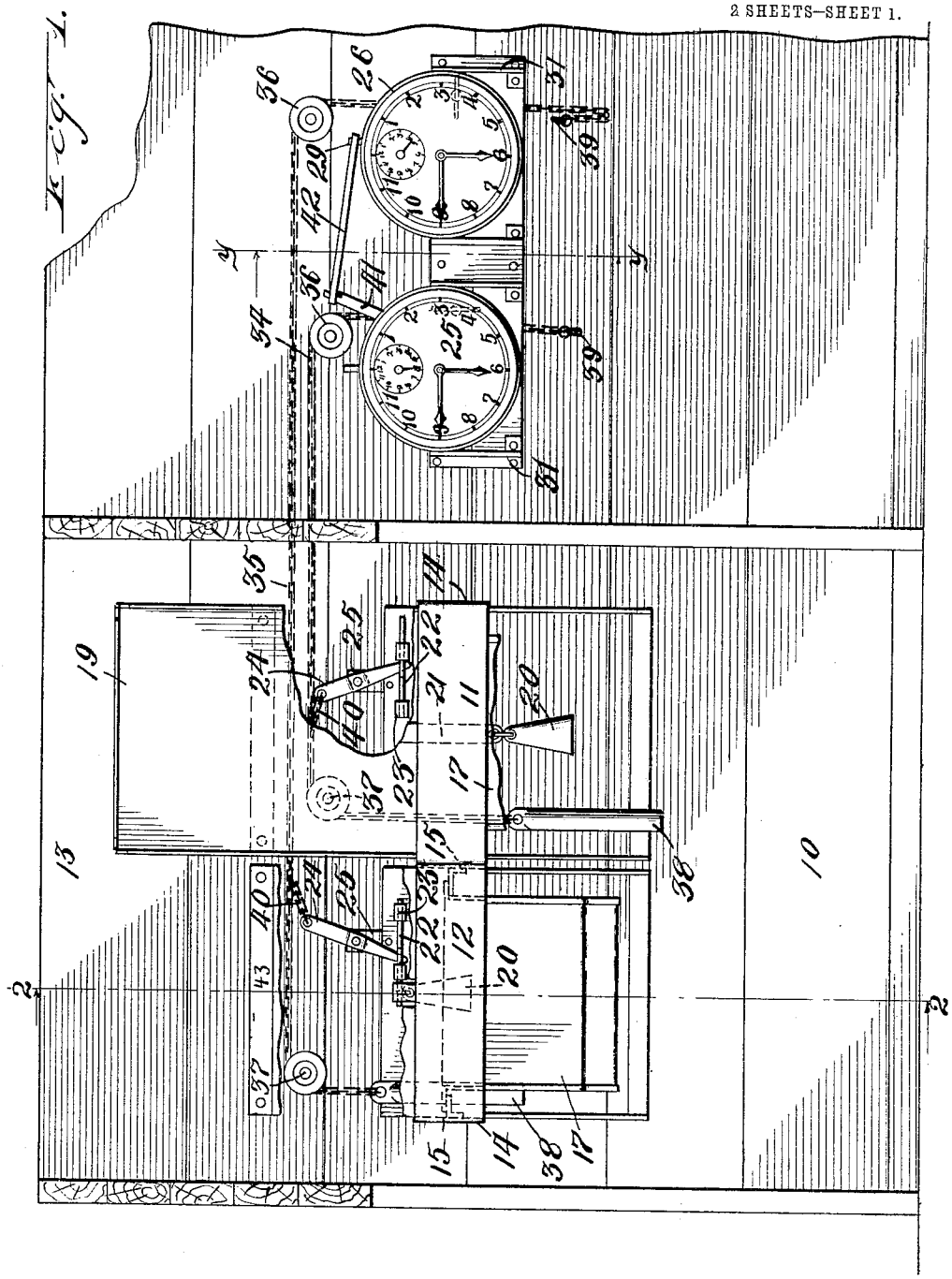

UNITED STATES PATENT OFFICE.

CHARLES CASPARI, OF MILWAUKEE, WISCONSIN.

AUTOMATIC STOCK-FEEDER.

1,124,859.    Specification of Letters Patent.    Patented Jan. 12, 1915.

Application filed March 31, 1910.    Serial No. 552,491.

*To all whom it may concern:*

Be it known that I, CHARLES CASPARI, residing in Milwaukee, in the county of Milwaukee and State of Wisconsin, have invented new and useful Improvements in Automatic Stock-Feeders, of which the following is a description, reference being had to the accompanying drawings, which are a part of this specification.

This invention relates to improvements in automatic stock feeders.

It is one of the objects of this invention to provide an automatic stock feeder which is readily adapted to be placed in stalls and which is capable of preventing the animal from obtaining access to the feed until a predetermined time and of automatically opening the feed bins at such time.

A further object of the invention is to provide an automatic stock feeder which is adapted to permit animals to have access to feed bins at different time periods with one setting of the mechanism so that the feeder may be arranged to automatically feed the animal at a predetermined period of time in the evening and at a predetermined period of time the next morning without requiring personal attendance.

A further object of the invention is to provide an automatic stock feeder which is provided with removable bins whereby said bins may be easily removed for cleaning purposes and kept in a sanitary condition.

With the above, and other objects in view, the invention consists of the automatic stock feeder and its parts and combinations as set forth in the claim, and all equivalents thereof.

Referring to the accompanying drawings in which the same reference characters indicate the same parts in all of the views; Figure 1 is a front view of the stock feeder with parts broken away and removed to show interior parts; Fig. 2 is a vertical sectional view thereof taken on line 2—2 of Fig. 1; Fig. 3 is a vertical medial sectional view of the clock mechanism and connections for controlling the feeder, parts broken away; Fig. 4 is a top view of the mechanism shown in Fig. 3; Fig. 5 is a vertical sectional view of the clock mechanism taken on line 5—5 of Fig. 4; Fig. 6 is a perspective view of one of the bins removed from its support; and Fig. 7 is a detail of the releasing mechanism of one of the bin covers.

In the drawings the numeral 10 indicates an animal stall and 11 and 12 feed bins connected to the front wall 13 thereof. These feed bins comprise rectangular supporting frames 14 rigidly connected to the vertical stall wall and extending horizontally into the stall. The inner front and side portions of the rectangular frames are provided with inwardly extending shoulders or flanges 15 and transverse pieces 16 forming rectangular supporting means to accommodate feed bins or receptacles 17. The bins are formed of sheet metal and have their upper edges bent over at right angles to form flanges 18 which are adapted to rest on top of the shoulders 15 and the transverse pieces 16 of the rectangular frame. The transverse pieces 16 are spaced a distance from the wall 13 of the stall to provide spaces between said wall and the pieces for the operating mechanism. Each rectangular frame is provided with a hinged cover 19 having a weight 20 suspended from an extending arm 21 at its inner end which is adapted to normally hold the cover raised from its frame and in open position. The inwardly extending shoulders of the rectangular frames are positioned a considerable distance below the upper edges of said frames so that when the covers are in a closed position their upper surfaces will be below the upper edges of the rectangular frames thereby forming a construction in which it is impossible for the animals to lift the covers and get at the contents of the bins. The covers, which are preferably formed of sheet metal, are flanged downwardly at their edges as an additional safeguard to prevent the animals from lifting said covers, and also to strengthen said covers.

Sliding bolts 22 mounted in brackets 23 fastened to the stall wall are positioned to slide beneath the ends of the extending arms 21 and hold the said arms and covers connected thereto in closed position on top of the bins. The sliding bolts are provided with slots extending therethrough to accommodate the lower ends of bolt levers 24 medially, pivotally supported on upstanding arms 25 connected to the rectangular frames.

Alarm clocks 25 and 26 provided with the usual alarm mechanism, alarm winding keys 27 and 28 and stop arm levers 29 and 30 are fastened to clamping brackets 31 which are connected to any suitable support outside of the stall. Trip levers 32 and 33 pivotally connected to the clock brackets are positioned so they may be swung horizontally with their longer ends resting on top of the wings of the keys and in the paths of movement thereof. The short arms of these levers are shaped to be inserted in the links of chains 34 and 35. These chains extend upwardly and over pulleys 36 and thence horizontally to other pulleys 37 positioned adjacent to the feed bins. From these last mentioned pulleys the chains depend downwardly and are provided with weights 38 adapted to move said chains longitudinally when released from the trip levers 32 and 33 respectively. The other ends of these chains are connected to the vertical wall by means of staples 39 to limit the movement of the weights and connected chains. The bolt levers are connected to the chains by short chain lengths 40 so that when the trip levers are released from the chains the movements of said chains will swing the bolt levers and release the covers and thus permit them to swing upwardly into open position.

A stop arm moving lever 41 pivotally connected to the clock 25 and having its lower end in the path of movement of the alarm winding key of said clock is provided with a link 42 pivotally connected to its upper end and the opposite end of the link is connected to the stop lever 29 of the other clock so that when the alarm of the clock 25 rings, its winding key will move the stop arm lever and link and release the alarm mechanism of the clock 26. When the alarm mechanism is thus released it is adapted to operate when the hands of the clock indicate the time to which it has been set to ring the alarm. The stop arm of the clock 26 is normally set in the "off" position so that its alarm mechanism will not ring when the hands first indicate the hour to which it has been set.

Shields 43 are positioned in front of the releasing levers to guard against the animals accidentally moving the mechanism to open the covers.

The operation of the feeder is as follows: The clocks are wound and the alarm mechanism set as desired and the bins are then filled with the proper food and the covers closed down over them and are held in closed position by sliding the bolts over the tops of the extending arms connected to the covers. The chains are then drawn taut to lift the weights connected thereto and the links of the chains are engaged by the trip levers the long arms of which have been swung upwardly and rest on top of the winding keys of said clocks.

The alarm mechanism of the clock 25 must be set to ring first to raise the cover of the bin nearest to said clock so that when the alarm mechanism of the said clock is operated its winding key will engage and turn the stop arm moving lever and through the connecting link move the stop arm of the clock 26 and set the alarm mechanism of said clock in the "on" position so that it will operate to release the bin cover when the hands of the said clock indicate the time its alarm has been set to ring.

It is of course obvious that both clocks cannot be set to open the bins at the same hour of the night and the morning as this would cause both clocks to release the covers at the same time the first clock was set to operate at. Also the first clock must not be set to operate at an hour in the evening previous to the hour which it is desired to operate the feeder the next morning, as this setting would cause both clocks to release the covers at the same time in the evening.

From the foregoing description it will be seen that the feeder is very simple in construction and operation and is inexpensive to maintain.

What I claim as my invention is:

In an automatic stock feeder having a bin, the combination of a time controlling means, a pivoted cover for the bin, a weighted arm secured to said cover, releasing means for said arm, comprising a bolt slidably mounted beneath said arm, and a lever for operating said bolt actuated by the time controlling means, whereby the weighted arm will be released to open the cover of the bin.

In testimony whereof, I affix my signature, in presence of two witnesses.

CHARLES CASPARI.

Witnesses:
C. H. KEENEY,
ALMA A. KLUG.

Copies of this patent may be obtained for five cents each, by addressing the "Commissioner of Patents, Washington, D. C."